US012666276B2

(12) United States Patent
Zhang et al.

(10) Patent No.: US 12,666,276 B2
(45) Date of Patent: Jun. 23, 2026

(54) METHOD AND APPARATUS FOR DETERMINING PREDICTION FOR STATUS OF WIRELESS NETWORK

(71) Applicant: Lenovo (Beijing) Limited, Beijing (CN)

(72) Inventors: Congchi Zhang, Shanghai (CN); Mingzeng Dai, Shanghai (CN); Le Yan, Shanghai (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 424 days.

(21) Appl. No.: 18/271,144

(22) PCT Filed: Jan. 8, 2021

(86) PCT No.: PCT/CN2021/070943
§ 371 (c)(1),
(2) Date: Jul. 6, 2023

(87) PCT Pub. No.: WO2022/147786
PCT Pub. Date: Jul. 14, 2022

(65) Prior Publication Data
US 2024/0306011 A1     Sep. 12, 2024

(51) Int. Cl.
*H04W 24/10*     (2009.01)
*H04W 24/02*     (2009.01)
*H04W 92/20*     (2009.01)

(52) U.S. Cl.
CPC ........... *H04W 24/02* (2013.01); *H04W 24/10* (2013.01); *H04W 92/20* (2013.01)

(58) Field of Classification Search
CPC ..... H04W 24/02; H04W 24/10; H04W 92/20; H04W 24/08; H04L 41/147; H04L 41/16; H04L 370/329
See application file for complete search history.

(56) References Cited

U.S. PATENT DOCUMENTS

2020/0059414 A1     2/2020   Andersson et al.
2023/0403606 A1*   12/2023   Lunardi ................ H04W 24/02

FOREIGN PATENT DOCUMENTS

CN          111589157 A      8/2020

OTHER PUBLICATIONS

PCT/CN2021/070943 , "International Preliminary Report on Patentability", PCT Application No. PCT/CN2021/070943, Jul. 20, 2023, 6 pages.

(Continued)

*Primary Examiner* — Chuong A Ngo
(74) *Attorney, Agent, or Firm* — FIG. 1 Patents

(57)     ABSTRACT

The present application relates to a method and an apparatus for determining a prediction for a status of a wireless network. One embodiment of the present disclosure provides a method for determining a prediction for a status of a wireless network, comprising: transmitting a first request associated with the prediction to a first node and a second node; receiving information of a trained AI model from the second node; transmitting, to the first node, input for the trained AI model; and receiving the prediction from the first node, wherein the prediction is determined based on the trained AI model and the input.

20 Claims, 9 Drawing Sheets

601 — transmitting a first request associated with the prediction to a first node and a second node 602 — receiving information of a trained AI model from the second node 603 — transmitting, to the first node, first data determined based on the information of the trained AI model as an input 604 — receiving the prediction from the first node, wherein the prediction is determined based on the trained AI model and the first data

(56)                References Cited

OTHER PUBLICATIONS

PCT/CN2021/070943 , "International Search Report and Written Opinion", PCT Application No. PCT/CN2021/070943, Jul. 6, 2021, 7 pages.

ZTE, et al., "Initial Analyse on the Interface Impact with AI-based RAN Architecture", 3GPP TSG-RAN WG3 Meeting #110e, R3-206092 [retrieved Aug. 8, 2023]. Retrieved from the Internet <https://www.3gpp.org/ftp/tsg_ran/WG3_lu/TSGR3_110-e/Docs>., Nov. 2020, 6 Pages.

* cited by examiner

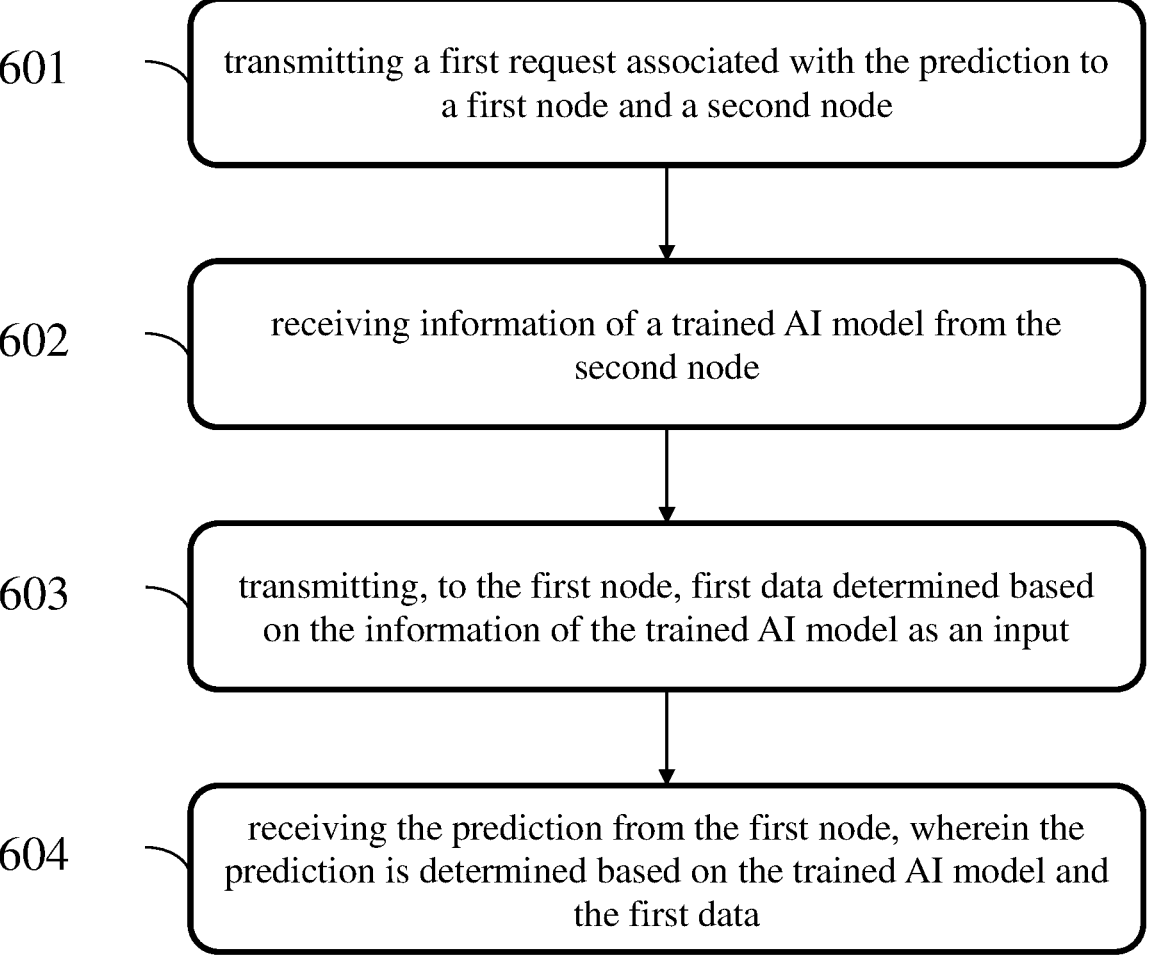

601 — transmitting a first request associated with the prediction to a first node and a second node 602 — receiving information of a trained AI model from the second node 603 — transmitting, to the first node, first data determined based on the information of the trained AI model as an input 604 — receiving the prediction from the first node, wherein the prediction is determined based on the trained AI model and the first data

Fig. 6

701    receiving a first request associated with a prediction for a status of a wireless network from a first node or from a second node 702    transmitting a trained AI model to the second node 703    transmitting information of the trained AI model to the first node or to the second node

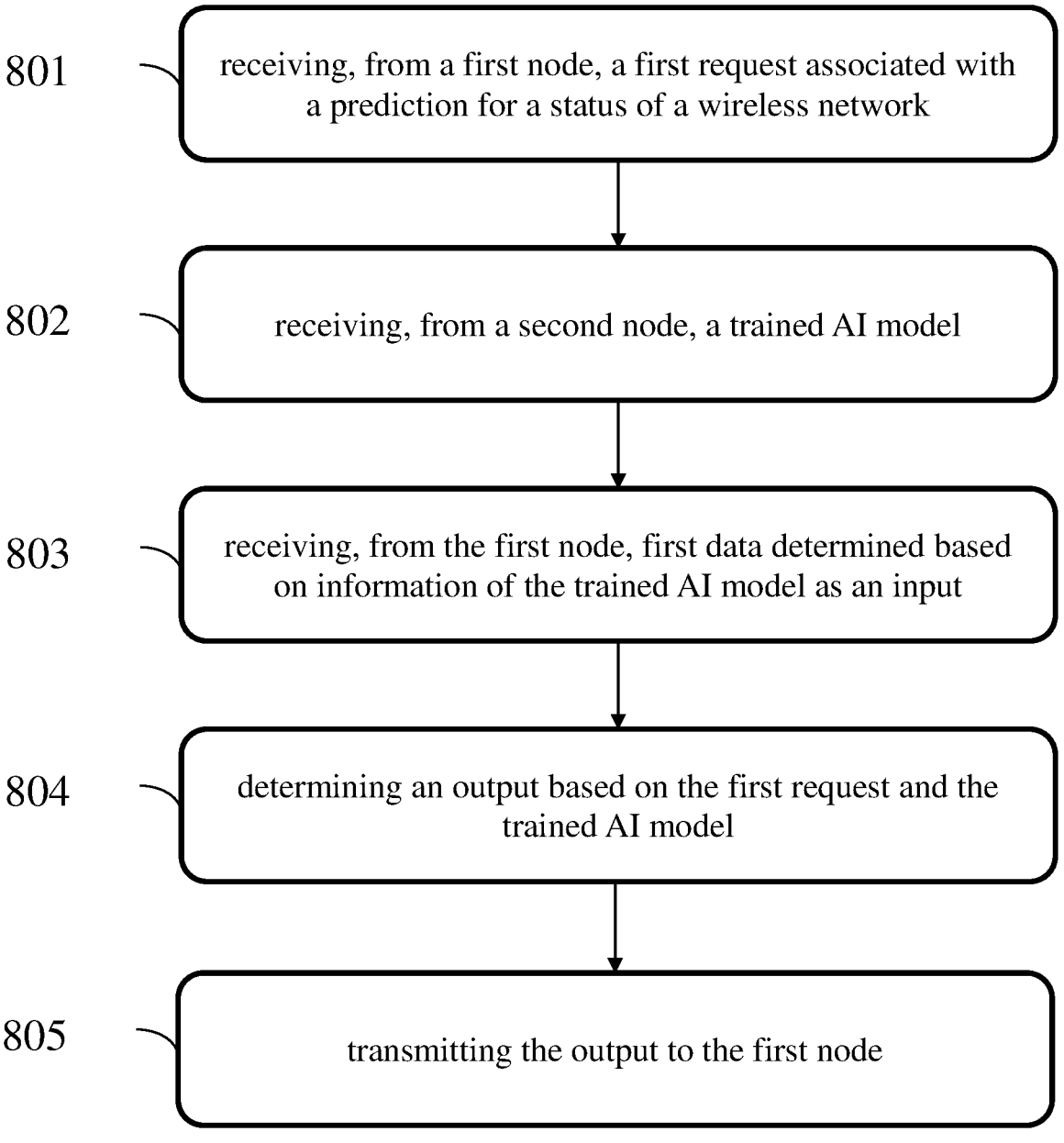

801    receiving, from a first node, a first request associated with a prediction for a status of a wireless network 802    receiving, from a second node, a trained AI model 803    receiving, from the first node, first data determined based on information of the trained AI model as an input 804    determining an output based on the first request and the trained AI model 805    transmitting the output to the first node

Fig. 8

METHOD AND APPARATUS FOR DETERMINING PREDICTION FOR STATUS OF WIRELESS NETWORK

TECHNICAL FIELD

The present application relates to wireless communication technology, especially for a method and an apparatus for determining a prediction for a status of a wireless network, for example, a status of the radio access network (RAN).

BACKGROUND OF THE INVENTION

With the development of artificial intelligence (AI) technology, it might be used in the radio access network, to further optimize the performance of the communication system. For example, the AI might be used for energy saving, load balancing, traffic steering, or mobility optimization, etc.

Therefore, it is desirable to provide methods and apparatuses for using the AI technology within the RAN network.

SUMMARY

One embodiment of the present disclosure provides a method for determining a prediction for a status of a wireless network, comprising: transmitting a first request associated with the prediction to a first node and a second node; receiving information of a trained AI model from the second node; transmitting, to the first node, input for the trained AI model; and receiving the prediction from the first node, wherein the prediction is determined based on the trained AI model and the input.

In one embodiment of the present disclosure, the status of the wireless network includes at least one of the following: traffic load, reliability, latency, data rate, and link quality.

In one embodiment of the present disclosure, the first request includes at least one of following: an identity of a UE associated with the trained AI model; an identity of a RAN node associated with the trained AI model; an identity of a cell associated with the trained AI model; an accuracy of the prediction; an improvement requirement associated with the accuracy; time information; first information of the input; and a function of the trained AI model.

In one embodiment of the present disclosure, the time information includes a time advance value and/or an absolute time stamp.

In one embodiment of the present disclosure, the information of the trained AI model includes at least one of following: an identity of the trained AI model; an identity of a UE associated with the trained AI model; an identity of a RAN node associated with the trained AI model; an identity of a cell associated with the trained AI model; a list of predictions associated with the trained AI model; an accuracy associated with each item in the list of predictions; an improvement associated with each item in the list of predictions; second information of the input; a function of the trained AI model, and third information of feedback.

In one embodiment of the present disclosure, the method further includes transmitting a feedback for the trained AI model to the second node, wherein the feedback includes at least one of following: an identity of the trained AI model; a cause for transmitting the feedback; and feedback for AI model training.

In one embodiment of the present disclosure, the feedback is transmitted periodically with a predetermined period or in one shot with a format determined by the second node, and the cause for transmitting the feedback includes: an accuracy or an improvement of the trained AI model is below a threshold. The period may be predetermined by the training node, or is a fixed value, or predefined in the specification.

In one embodiment of the present disclosure, the method further includes receiving an AI capability of a RAN node in at least one of the following occasions: via a Xn interface from the RAN node during a Xn interface setup procedure, a SN addition procedure, or a SN modification procedure; or via a N2 interface from operations, administration and maintenance (OAM) or access and mobility management function (AMF).

In one embodiment of the present disclosure, the AI capability includes at least one of the following: inference, training an AI model, providing an AI model, updating an AI model, providing the prediction.

In one embodiment of the present disclosure, the method further includes receiving a second request from a RAN node or transmitting the second request to the RAN node, wherein the second request includes at least one of the following: a measurement of the status of the wireless network and time information associated with the measurement; the prediction and time information associated with the prediction; a period for an update of the status of the wireless network; an improvement requirement; a period of the measurement; and a period of the prediction.

In one embodiment of the present disclosure, the first request is triggered upon receiving the second request.

In one embodiment of the present disclosure, the time information includes a time advance value and/or an absolute time stamp.

In one embodiment of the present disclosure, the method further includes receiving or transmitting a response to the second request periodically or in one shot, wherein the response includes at least one of following: a result of the measurement; and a result of the prediction.

Another embodiment of the present disclosure provides a method, which includes receiving a first request associated with a prediction for a status of a wireless network from a first node or from a second node; transmitting a trained AI model to the second node; and transmitting information of the trained AI model to the first node or to the second node.

In one embodiment of the present disclosure, the first request includes at least one of following: an identity of a UE associated with the trained AI model; an identity of a RAN node associated with the trained AI model; an identity of a cell associated with the trained AI model; an accuracy of the prediction; an improvement requirement associated with the accuracy; time information; first information of the input; and a function of the trained AI model.

In one embodiment of the present disclosure, the information of the trained AI model includes at least one of following: an identity of the trained AI model; an identity of a UE associated with the trained AI model; an identity of a RAN node associated with the trained AI model; an identity of a cell associated with the trained AI model; a list of predictions; an accuracy associated with each item in the list of predictions; an improvement associated with each item in the list of predictions; second information of the input; a function of the trained AI model; and third information of feedback.

In one embodiment of the present disclosure, the method further includes: receiving a feedback for the trained AI model from the first node, wherein the feedback includes at least one of following: an identity of the trained AI model; a cause for transmitting the feedback; and feedback for AI model training.

In one embodiment of the present disclosure, the feedback is transmitted periodically with a predetermined period or in one shot with a format determined by the first node, and the cause for transmitting the feedback includes: an accuracy or an improvement of the trained AI model is below a threshold.

In one embodiment of the present disclosure, the method further includes: retraining the trained AI model based on the feedback; and updating the AI model if retrained AI model has an improved accuracy compared with the trained AI model.

Another embodiment of the present disclosure provides a method, which includes: receiving, from a first node, a first request associated with a prediction for a status of a wireless network; receiving, from a second node, a trained AI model; receiving, from the first node, input for the trained model; determining an output based on the first request and the trained AI model; and transmitting the output to the first node.

In one embodiment of the present disclosure, the first request includes at least one of following: an identity of a UE associated with the trained AI model; an identity of a RAN node associated with the trained AI model; an identity of a cell associated with the trained AI model; an accuracy of the prediction; an improvement requirement associated with the accuracy; time information; first information of the input; and a function of the trained AI model.

Yet another embodiment of the present disclosure provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions are executable by the processor, to implement the method for determining a prediction for a status of a wireless network, comprising: transmitting a first request associated with the prediction to a first node and a second node; receiving information of a trained AI model from the second node; transmitting, to the first node, input for the trained AI model; and receiving the prediction from the first node, wherein the prediction is determined based on the trained AI model and the input.

BRIEF DESCRIPTION OF THE DRAWINGS

FIG. 6 illustrates a method performed by a RAN node for determining a prediction for a status of a wireless network according to some embodiments of the present disclosure.

FIG. 8 illustrates a method performed by an AI inference node for determining a prediction for a status of a wireless network according to some embodiments of the present disclosure.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Figure 1:
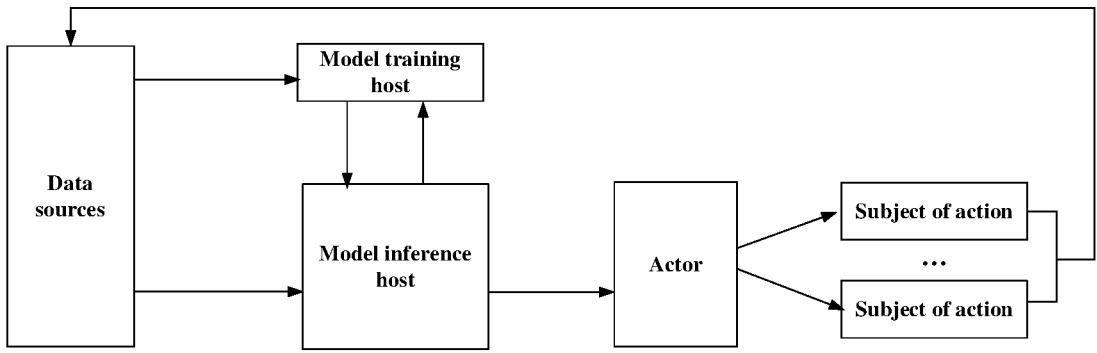
FIG. 1 illustrates a functional framework for RAN intelligence according to some embodiments of the present disclosure.

FIG. 1 illustrates a functional framework for RAN intelligence in accordance with some embodiments of the present disclosure.

FIG. 1 includes the following components:
1. Data sources, which may provide the training data to the model training host, and provide inference data to the model inference host. The data sources also receive performance feedback for different actions.
2. Model training host, which may train the model based on the training data sent from the data sources, and may provide model deployment or model update to the model inference host. The model training host may also receive model performance feedback from the model inference host.
3. Model inference host, which may receive the inference data from the data sources and the model deployment or model update from the model training host, based on the inference data and the model, the model inference host transmits an output to the actor. The model inference host may also transmit model performance feedback to the model training host.
4. Actor, which determines different actions based on the output of the model inference host, and transmits these actions to different subjects of actions.
5. Subject of action, which follows the instructions sent from the actor, and may transmit performance feedback to the data sources.

In FIG. 1, the requested data is sent to model training host or model inference host whenever they are available, while the AI model only needs to be updated when the prediction accuracy becomes bad. For example, the AI model only need data in the last 10 minutes, not the data in the period from the time point of the last model update to the time point of retraining the model. That is, not all data are useful and need to be sent to the training host.

FIG. 1 also does not show if any predicted value (i.e., the output of the model inference host) will be provided to the training host for the model updating or training, and how the predicted value is provided.

The predicted value might be used in the following scenarios: in a prediction task, the last predicted value may be used as an input, to predict the output value for the next time. In decision-oriented task, e.g., a handover decision, the AI model for handover decision will need prediction value of e.g., traffic load. To sum up, it would be more future proof to have the data source collect all data including both measurements and prediction.

Figure 2:
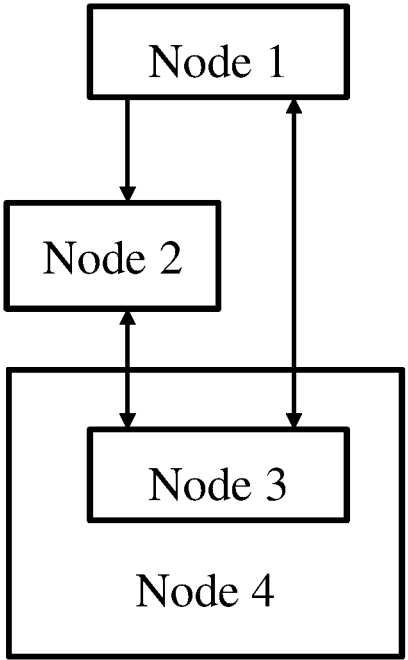
FIG. 2 illustrates a block diagram of a RAN node according to some embodiments of the present disclosure.

FIG. 2 illustrates a block diagram of a RAN node according to the embodiments of the present disclosure.

In FIG. 2, node 4 represents a RAN node. Node 1 is a node that is capable of training an AI model, providing an AI model, and updating an AI model, it can be referred to as an AI training host, an AI training device, or an AI training node, etc. Node 1 may perform an online or offline process to train an AI model by learning features and patterns that best present data and get the trained AI model for inference. The AI model can be a data driven algorithm. The AI model can apply AI techniques that generates a set of outputs consisting of predicted information, based on a set of inputs. Node 1 may be co-located with Node 4, or not. In some other embodiments, node 4 may include node 1, or node 4 is associated with node 1.

Node 2 is a node that adopts the AI model sent from node 1, and performs inference for a certain task, it may be referred to as an AI inference host, an AI inference device, or an AI inference node, etc. Node 2 may perform a process of using a trained AI model to make a prediction or guide the decision based on collected data and AI model. Node 2 may be co-located with Node 4, or not. In some other embodiments, node 4 may include node 2, or node 4 is associated with node 2.

Node 3 is a node that provides data to node 1 and node 2, and also receives the output or feedback from node 1 or node 2. Node 3 can be referred to as a data broker, a data source, a data node, or the like. Node 3 may store the data collected from the network nodes, management entity, or the UE, the basis for AI model training, data analytics and inference, etc.

Node 3 may be included in the RAN node, that is, node 3 and node 4 can be the same device. Hereinafter in the present disclosure, node 1 is referred to as an AI training node, node 2 is referred to as an AI inference node, node 3 is referred to as a data node, and node 4 is referred to as a RAN node.

In this present disclosure, each RAN node is associated with an AI training node, an AI inference node and a data node. The AI training node 1, the AI inference node 2, and the data node 3 may be co-located or separately located inside or outside the RAN node. In FIG. 2, although it depicts that the RAN node 4 includes data node 3, the AI training node 1, the AI inference node 2 and the data node 3 may all be included in the RAN node. In other scenarios, the AI training node 1, the AI inference node 2 and the data node 3 can be located outside of the RAN node, but they are still associated with the RAN node. For example, the AI inference node may be part of RAN distributed unit (DU), and the AI training node can be part of RAN centralized unit (CU). Alternatively, the AI inference node can be a part of RAN DU or CU, while the AI training node may be located within the 5G core network. For example, the AI training node may be located in an access and mobility management function (AMF), operations, in an administration and maintenance (OAM), network data analytics function (NWDAF), in a user plane function (UPF), or in a session management function (SMF) of the 5G system architecture.

For example, for traffic load prediction, the related data node 3 is located in RAN CU, which collects information about data volume for each UE, the AI inference node is located in RAN CU as well to make prediction based on the information collected by data node 3. The AI model is used by the AI inference node 2 is retrieved from the AI training node 1, which is located in the SMF.

In another example, for reliability prediction, the related data node 3 is located in RAN DU, which collects information about link quality for each UE, the AI inference node is located in RAN CU as well to make prediction based on the information collected by data node 3. The AI model is used by the AI inference node 2 is retrieved from the AI training node 1, which is located in the NWDAF.

Figure 3:
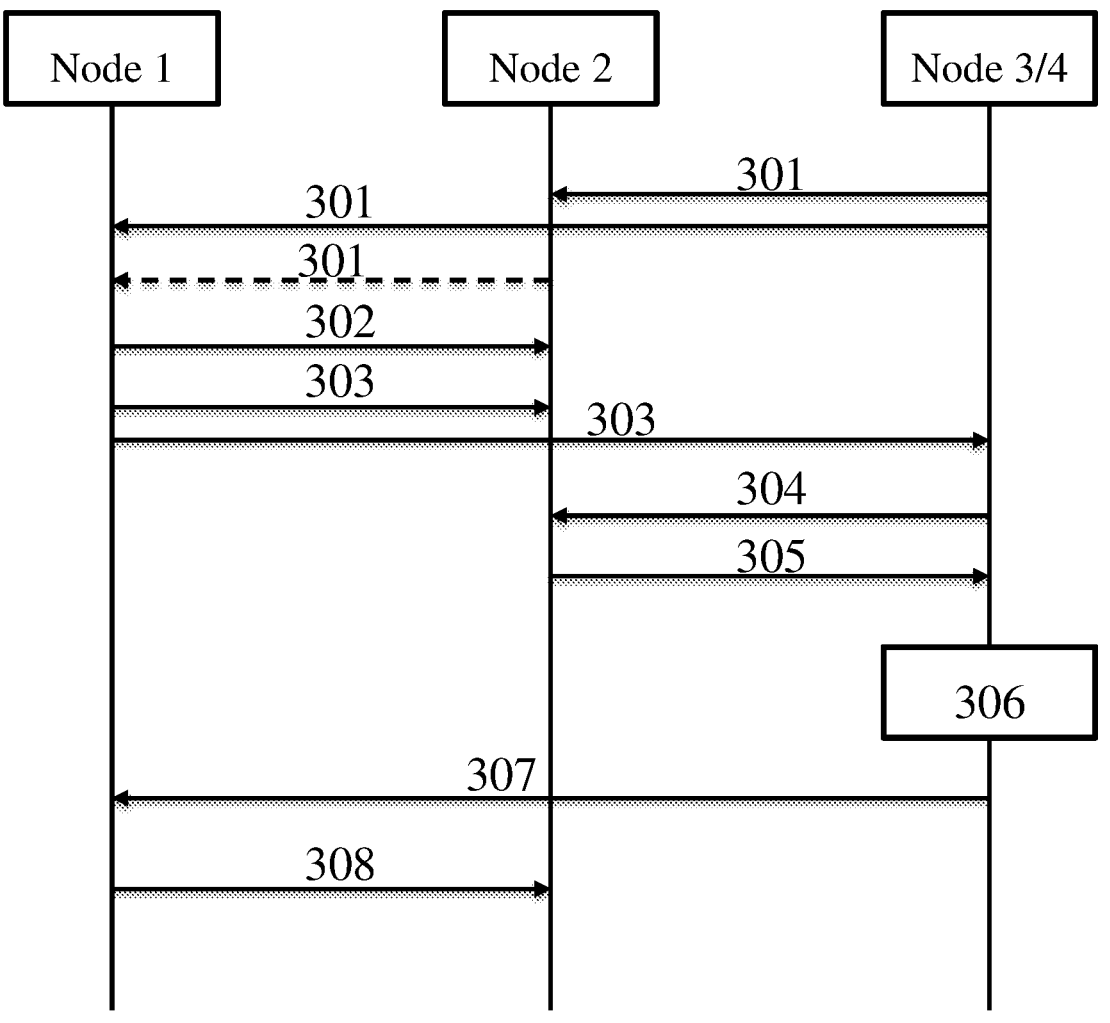
FIG. 3 illustrates a flow chart of determining a prediction for a status of a wireless network according to some embodiments of the present disclosure.

FIG. 3 illustrates a flow chart for determining a prediction for a status of a wireless network according to the embodiments of the present disclosure.

The status of a wireless network, such as the status of the RAN, may be the traffic load of the RAN node, or the quality of service (QOS) of the RAN node, for example, the data rate, reliability, latency, the link quality, or the like. Hereinafter in the present disclosure, the status of the RAN network can be referred to as RAN status. With the AI technology, the RAN node is able to provide a list of predictions or measurements regarding the RAN status.

In FIG. 3, the data node 3 is deployed inside the RAN node 4, and is presented with the reference numeral "Node 3/4", Node 3/4 makes the decision of when or how to provide the data to the AI training node 1 and the AI inference node 2.

The AI inference node 2 may request the AI training node 1 to provide or update an AI model. Some AI update policies may be configured by the AI training node regarding how the feedback data shall be provided. In the present disclosure, the node 3/4, or the data node provides the feedback data to the AI training node to update the model.

In order to determine the prediction of the RAN status, in operation 301, the node 3/4 transmits a request message to both the AI training node 1 and the AI inference node 2. In some embodiment, the AI inference node may also transmit a request message to the AI training node 1 in step 301. For example, upon receiving a request from node 3/4, node 2 transmits the request to node 1, to request a trained AI model to perform the inference operations.

The request message can be referred to as an AI model request message, and may include at least one of the following information:

1. The identity of the UE, the RAN node, or the cell that is associated with the prediction. For example, the prediction aims to predict the traffic load of the RAN node, and it follows that the request message includes the identity of the RAN node.

2. The list of requested predictions, which further includes any combination of the following:
   i. The required accuracy of the prediction;
   ii. The required gain or improvement of the prediction accuracy compared to a reference or baseline value, or compared to the accuracy of a previous AI model; and
   iii. The time advance, i.e. the prediction is for how much of time (e.g. 1 hour) after the prediction is made.

3. The list of available measurements or data collected locally, or collected from the counterpart node that can be provided as feed data, or input data for AI model update, which further includes any of the following: the period of the feed measurement or data provision, that is, how often can the feed measurement or data can be provided to the AI model training host.

4. The function of the AI model, for example, the AI model is capable of predicting the available capacity within a future period, or the AI model is capable of predicting the traffic within a future period, or the like.

The list of requested predictions and the list of available measurements or data may be linked to each specific UE, RAN node or cell when sent in the AI model request message.

In operation 302, after receiving the AI model request, the AI training node 1 determines a trained model based on the information in the AI model request, and provides the trained model to the AI inference node 2.

In operation 303, the AI training node 1 may also provide information of the AI model to both the AI inference node 2 and the data node 3 of the RAN node, the information may include at least one of the following parameters:

1. The identity or the index of the provided AI model;
2. The list of UEs, the RAN nodes, or the cells that the provided model is associated with, or the provided model is applicable to;
3. The list of requested predictions that the provided model is associated with;
4. The prediction accuracy of the provided AI model;
5. The gain or improvement of the prediction accuracy of the provided AI model compared to a reference or baseline value, or compared to the accuracy of the previous AI model; and
6. The policy of feed measurement or data provision, which further include any of the following information:
   i. The list of feed measurement or data needed for the AI training or inference;
   ii. The period of AI model feedback, e.g. the RAN node provides AI model feedback every period of time;
   iii. The accuracy or gain threshold that triggers the AI model feedback, e.g. the RAN node triggers AL model feedback only if the accuracy of the current model is below a threshold compared with the prediction and measurement result; and
   iv. The format of the feed measurement or data, e.g. the batch size or the requested number of logged measurements shall be provided each time.
   v. The function of the AI model, for example, the AI model is capable of predicting the available capacity within a future period, or the AI model is capable of predicting the traffic within a future period, or the like.

In operation 304, after receiving the information of the AI model from the AI training node 1, the data node 3 provides the corresponding measurements or data to the AI inference node 2. The corresponding measurements or data is determined based on the information of the AI model. For example, the data node 3 can provide to the AI inference node 2, the data of the UEs that the AI model is applicable to.

Correspondingly, the AI inference node 2 uses the measurement or data sent from the data node 3 as the input, and with the AI model provided by the AI training node 1, the AI inference node 2 predicts the RAN status, i.e., the AI inference node 2 determines the RAN status prediction. In operation 305, the AI inference node 2 sends the RAN status prediction to data node 3.

In operation 306, the data node 3 determines whether an AI model feedback message is needed according to the received model-related configuration from the AI training host. The AI model feedback message may be periodically transmitted to the AI training node 1, or it may be triggered when the accuracy of the AI model is below a given threshold. For example, the RAN status prediction received from the AI inference node 2 is compared with the RAN status measurement, thus the accuracy is obtained.

If it is determined to transmit the AI model feedback message, in operation 307, the data node 3 sends the AI model feedback message to the AI training node 1. The AI model feedback message may include at least one of the following:

1. the identity or the index of the AI model;
2. Cause, e.g., if the accuracy or gain is below a threshold; and
3. Requested data for AI training of requested format, e.g., the batch size or the requested number of logged measurements shall be provided each time.

After receiving the AI model feedback from the data node 3, the AI training node 1 may retrain the AI model, or update the AI model. After retraining the AI model or updating the AI model, if the AI training node 1 derives a more accurate AI model, in operation 308, the AI training node 1 transmits the derived AI model to the AI inference node 2.

Figure 4:
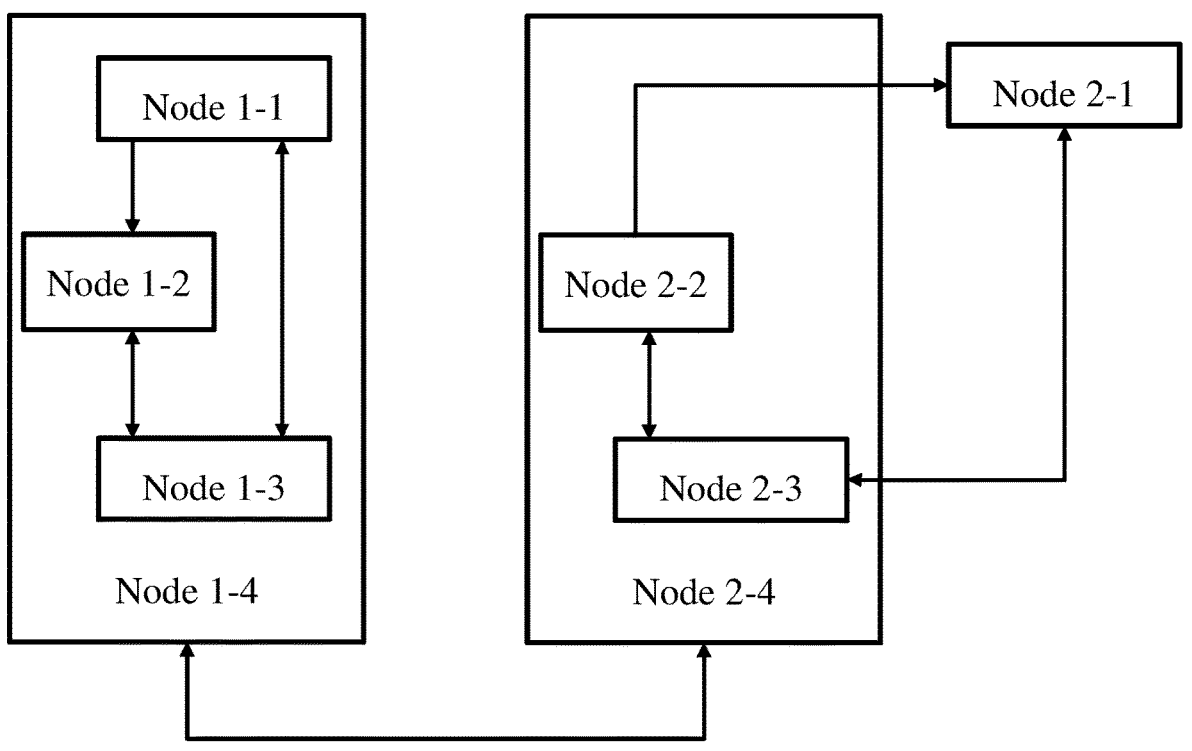
FIG. 4 illustrates a block diagram of two RAN nodes exchanging predictions or measurements of the status of a wireless network according to some embodiments of the present disclosure.

FIG. 4 illustrates a block diagram of two RAN nodes exchanging predictions or measurements of the status of the wireless network according to some embodiments of the present disclosure FIG. 4 includes two RAN nodes, RAN node 1-4 and RAN node 2-4. The RAN node 1-4 includes or is associated with an AI training node 1-1, an AI inference node 1-2, and a data node 1-3, the RAN node 2-4 includes an AI inference node 2-2 and a data node 2-3, and is associated with an AI training node 2-1, which is located outside of RAN node 2-4. In one embodiment, at least one of the two RAN nodes are able to perform the method in FIG. 3, that is, at least one of the two RAN nodes are able to use the AI technology to determine the RAN status prediction. More specifically, the AI training node 1-1 may provide a trained model to the AI inference node 1-2; the AI inference node 1-2 may receive input from the data node 1-3 and provide the corresponding output to the data node 1-3; the AI training node 1-1 may transmit the information of the model to the data node 1-3, and receive the feedback data from the data node 1-3.

In one embodiment, a RAN node may know the AI capability of other RAN nodes, for example, the neighbor RAN nodes, or other relevant nodes. For example, during the Xn interface setup, the SN addition procedure, or the SN modification procedure, RAN node 1-4 may inform its AI capability to RAN node 2-4 via the Xn interface. Or, the OAM or AMF may keep a RAN node updated about the AI capability of other RAN nodes via the N2 interface.

The AI capability of a RAN node may include at least one of the following capabilities:

1. Inference, for example, the RAN node may include an AI inference node, then the RAN node is capable of performing inference based on the AI trained model and the corresponding data;
2. Training, for example, the RAN node may include an AI training node, then the RAN node is capable of providing the trained AI model, training the AI model and updating the AI model;
3. providing the predicted traffic load; and
4. providing the predicted QoS, for example, the predicted data rate, the predicted reliability, the predicted latency, and the predicted link quality.

Regarding the traffic load, it may include at least one of the following:

1. radio resource usage, for example, uplink (UL)/downlink (DL) guaranteed bit rate (GBR) physical resource blocks (PRB) usage, UL/DL non-GBR PRB usage, UL/DL total PRB usage;
2. hardware (HW) load indicator, for example, the UL/DL hardware load may be: low, mid, high, overload;

3. A transport network layer (TNL) load indicator, for example, the UL/DL TNL load may be: low, mid, high, overload;

4. Cell Capacity Class value, which is represented with an UL/DL relative capacity indicator: the same scale shall apply to evolved universal terrestrial radio access (network) E-UTRAN, UTRAN and GSM Edge radio access network (GERAN) cells when mapping cell capacities on this value;

5. Capacity value, i.e. UL/DL available capacity for load balancing as percentage of total cell capacity.

In one preferred embodiment, a RAN node may request the RAN status prediction or the RAN status measurements from other RAN nodes, or provide the RAN status prediction or the RAN status measurements to other RAN nodes.

Figure 5:
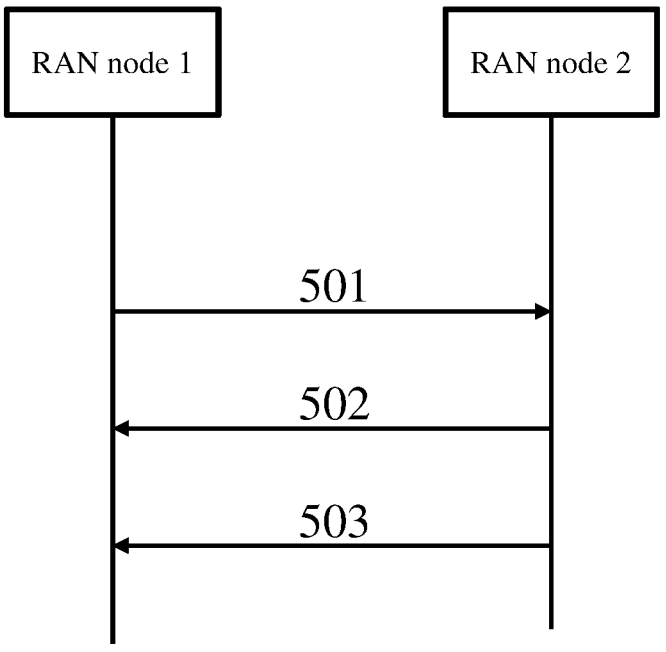
FIG. 5 illustrates a flow chart of two RAN nodes exchanging predictions or measurements of the status of a wireless network according to some embodiments of the present disclosure.

FIG. 5 illustrates a flow chart of two RAN nodes exchanging predictions or measurements of the status of a wireless network between two RAN nodes, according to some embodiments of the present disclosure.

In operation 501, RAN node 1 transmits a request to RAN node 2, which requests RAN node 2 to provide a list of predictions or measurements regarding counterpart node's RAN status periodically or in one shot.

The request message may include at least one of the following parameters:

1. an indicator for requesting for the RAN status measurement, the indicator may further define the period of the RAN status measurement, and/or the time information of the RAN status measurement.

The period of the RAN status measurement may be: per minute, per hour, etc. The time information may be the effective time point of the measurement, it might be a time advance or a time stamp. The time advance may indicate that the requested RAN status measurement is the measurement determined after the time TA has elapsed after receiving the request. For example, the value of TA is 1 hour, which suggests that the requested RAN status measurement is the RAN status measurement after 1 hour after the request is sent. The time stamp may indicate that the requested RAN status measurement to be measured at the time stamp. For instance, if the time stamp is 7 pm today, the requested RAN status measurement is a measurement performed at 7 pm today.

2. an indicator for requesting for the RAN status predictions, the indicator may further define at least one of the following parameters:
    i. the period of the RAN status prediction;
    ii. the required accuracy of the prediction;
    iii. the required gain or improvement of the prediction accuracy compared to a reference or baseline value or compared to the accuracy of the current AI model; and/or
    iv. the time information of the RAN status prediction.

The time information may be the effective time point of the prediction, it might be: a time advance, a time stamp, or number of RAN status updates, i.e., the prediction is for the next, the second, the third, . . . , or the x$^{th}$, RAN status update in the future, wherein x is an integer equal to or larger than one.

The time advance may indicate that the requested RAN status prediction is the prediction determined after the time TA has elapsed after receiving the request. For example, the value of TA being 1 hour suggests that the requested RAN status prediction is the RAN status prediction after 1 hour after the request is sent. The time stamp may indicate that the requested RAN status prediction is the measurement performed at the time stamp. For instance, if the time stamp is 7 pm today, the requested RAN status prediction is a prediction performed at 7 pm today.

3. Requested period of the RAN status update.

Upon receiving the request from RAN node 1, RAN node 2 may trigger and send an AI model request to the AI inference node and AI training node, that is, RAN node 2 would perform the method illustrated in FIG. 3. Alternatively, if RAN node 2 would like to predict the RAN status, it also may perform the method illustrated in FIG. 3.

In operation 502, RAN node 2 sends a response message to RAN node 1, to acknowledge that all or a sub-set of the requested measurements or prediction can be supported. Specifically, the response message may include at least one of the following parameters:

1. Results of the requested RAN status measurements, RAN node 2 may also provide the effective time point of the measurements, which can be represented with a time stamp, that is, the time the measurement was determined. In the case that the measurement period is configured in the request message sent in operation 501 from RAN node 1, the measurements are listed in the same order of execution, so that RAN node 1 may deduce the time according to the measurement period.

2. Results of the requested RAN status prediction; RAN node 2 may also provide the accuracy of the prediction. The accuracy may be calculated based on the comparison of the measurements results and the corresponding prediction results in the last RAN status update period. The accuracy may be the value provided from the AI training node, for example, in operation 303 in FIG. 3, the AI training node may provide the prediction accuracy of the provided AI model to the AI inference node and to the RAN node. In the case that RAN node 2 provides both prediction results and measurement results to RAN node 2, RAN node 2 may not provide the accuracy of the prediction, since RAN node 1 may deduce the accuracy of the prediction based on the prediction results and measurement results.

RAN node 2 may also provide the effective time point of the prediction, which can be represented with a time stamp, that is, the prediction is for which exact time point. In the case that the prediction period is configured in the request message sent in operation 501 from RAN node 1, the prediction results are listed in the same order of execution, so that RAN node 1 can deduce the time according to the prediction period.

3. The gain or improvement of the prediction accuracy compared to a reference or baseline value, or compared to the accuracy of the previous AI model.

In operation 503, RAN node 2 can send the RAN status update periodically or in one shot. RAN status can be traffic load or QoS (e.g., data rate, reliability, latency, link quality) related. The traffic load may be represented by indicators, such as: HW load indicator, TNL load indicator, or the like.

In one embodiment, the period of RAN status update, the period of measurement, and the period of prediction can be same or different. For example, the period of RAN status update can be multiples of the prediction period, and the prediction period can be multiples of the measurement period. As such, in the RAN status update report, multiples of measurements and predictions can be included.

In another embodiment, when the period of RAN status update is not configured, and a measurement is requested at a certain time in the future, the counterpart RAN node will trigger and send a RAN status update in one shot when the requested measurement is to be made in the future.

In another embodiment, the prediction or measurement acquisition or provision between RAN nodes may occur over Xn interface using new or existing Xn messages, the messages at least include: resource status request, resource status response, and resource status update.

FIG. 6 illustrates a method performed by a RAN node for determining a prediction for a status of a wireless network according to some embodiments of the present disclosure.

In order to determine a prediction for a status of a wireless network (such as: the traffic load, the reliability, the latency, or the data rate of the wireless network) using the AI technology, in operation 601, the RAN node transmits a first request associated with the prediction to the first node and the second node, that is, the AI inference node and the AI training node. The first request may request an AI model from the AI training node. In operation 602, the RAN node receives information of a trained AI model from the AI training node, in operation 603, the RAN node transmits input for the trained AI model to the AI inference node, and in operation 604, the RAN node receives the prediction from the AI inference node, which is determined by the AI inference node with the trained AI model and the input.

The first request may include at least one of following: an identity of a UE associated with the trained AI model; an identity of a RAN node associated with the trained AI model; an identity of a cell associated with the trained AI model; an accuracy of the prediction; an improvement requirement associated with the accuracy; time information, for instance: the time advance value and/or an absolute time stamp; the first information of the input; and a function of the trained AI model. The first information may include: the data node or the RAN node is able to provide which type of input, how to provide the input, and the timing point of providing the input or the like.

The information of the trained AI model includes at least one of following: an identity of the trained AI model; an identity of a UE associated with the trained AI model; an identity of a RAN node associated with the trained AI model; an identity of a cell associated with the trained AI model; a list of predictions associated with the trained AI model; an accuracy associated with each item in the list of predictions; an improvement associated with each item in the list of predictions; second information of the input; a function of the trained AI model, and third information of feedback. The second information may include: the required input specifically for the trained AI model, the format of the input, the time period of the input, or the like. The third information of the feedback may include: the data required for training or updating the AI model, for example, the predictions and the measurements at a certain time point, the format of the feedback, the triggering of feedback, the period of the feedback etc. The triggering of the feedback can be because the accuracy of the prediction is below a threshold, or the gain of the AI model is below a threshold.

In some embodiment, the RAN node may transmit a feedback for the trained AI model to the AI training node periodically with a predetermined period or in one shot, the period may be determined by the AI training host, or is a fixed value, or predefined in the specification. The feedback at least include: an identity of the trained AI model; a cause for transmitting the feedback; and/or feedback for AI model training.

The feedback is transmitted with the format determined by the AI training node, and the cause for transmitting the feedback includes: an accuracy or an improvement of the trained AI model is below a threshold.

In some embodiment, the RAN node may receive an AI capability of a RAN node via a Xn interface from the RAN node during a Xn interface setup procedure, a SN addition procedure, or a SN modification procedure; or via a N2 interface from operations, OAM or AMF. The AI capability may include at least one of the following: inference, training an AI model, providing an AI model, updating an AI model, providing the prediction.

In one preferred embodiment, the RAN node may receive a second request from a RAN node or transmit a second request to a RAN node, which requests at least one of the following: a measurement of the status of the wireless network and time information associated with the measurement; the prediction and time information associated with the prediction, such as a time advance value and/or an absolute time stamp; a period for an update of the status of the wireless network; an improvement requirement; a period of the measurement; and a period of the prediction.

Upon receiving this second request, the RAN node triggers the first request, which requests the AI training node and the AI inference node to provide the measurements or predations of the status of the wireless network, or the like. The RAN node may receive or transmit a response to the second request periodically or in one shot, and the response includes the result of the measurement; or the result of the prediction.

Figure 7:
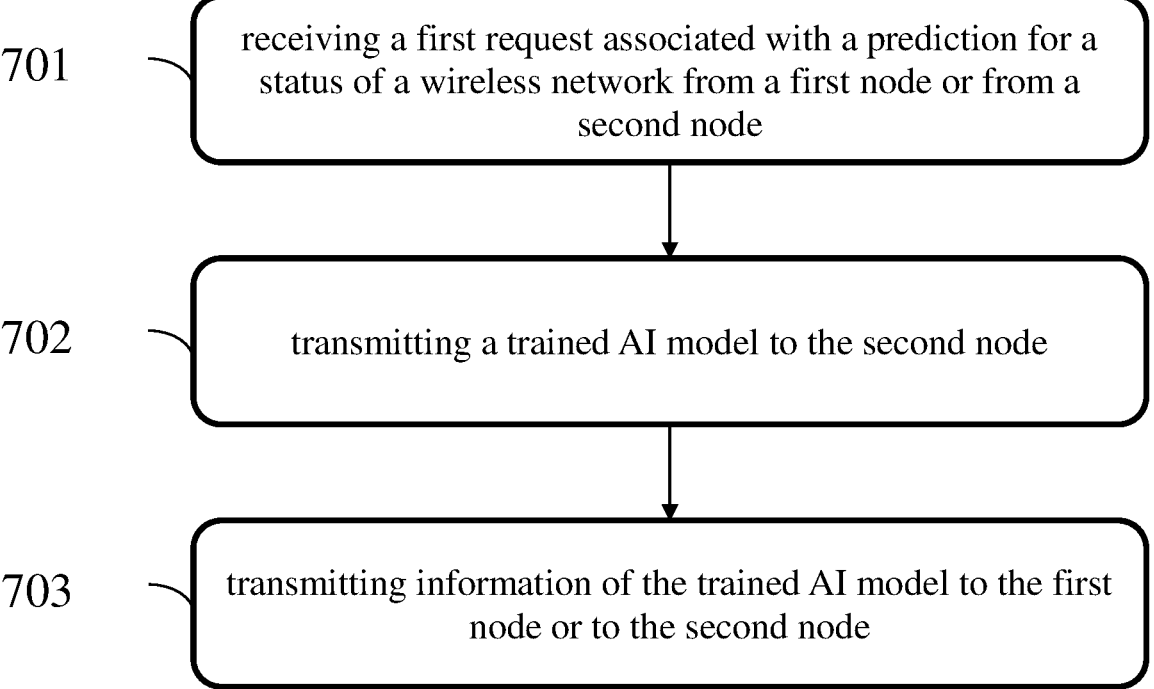
FIG. 7 illustrates a method performed by an AI training node for determining a prediction for a status of a wireless network according to some embodiments of the present disclosure.

FIG. 7 illustrates a method performed by an AI training node for determining a prediction for a status of a wireless network according to some embodiments of the present disclosure.

In operation 701, the AI training node receives a first request associated with a prediction for a status of a wireless network from the RAN node or the data node. In operation 702, the AI training node transmit a trained AI model to the AI inference node; and in operation 703, the AI training node transmit information of the trained AI model to the RAN node or to the AI inference node.

In some embodiment, the AI training node may receive a feedback from the RAN node, the feedback may include: an identity of the trained AI model; a cause for transmitting the feedback; and feedback for AI model training.

The feedback may be transmitted periodically with a predetermined period or in one shot with a format determined by the first node, and the cause for transmitting the feedback includes: an accuracy or an improvement of the trained AI model is below a threshold. The period may be predetermined by the training node, or is a fixed value, or predefined in the specification.

Upon receiving the feedback, the AI training node may retrain the trained AI model based on the feedback; and if retrained AI model has an improved accuracy compared with the trained AI model, the AI training node shall update the AI model.

FIG. 8 illustrates a method performed by an AI inference node for wireless communication according to some embodiments of the present disclosure.

In operation 801, the AI inference node receives a first request associated with a prediction for a status of a wireless network from the RAN node. In operation 802, the AI inference node receives a trained AI model from the AI training node. In operation 803, the AI inference node receives the input data determined based on information of the trained AI model from the RAN node. In operation 804, the AI inference node determines an output based on the first request and the trained AI model; then in operation 805, the AI inference node transmits the output to the RAN node.

Figure 9:
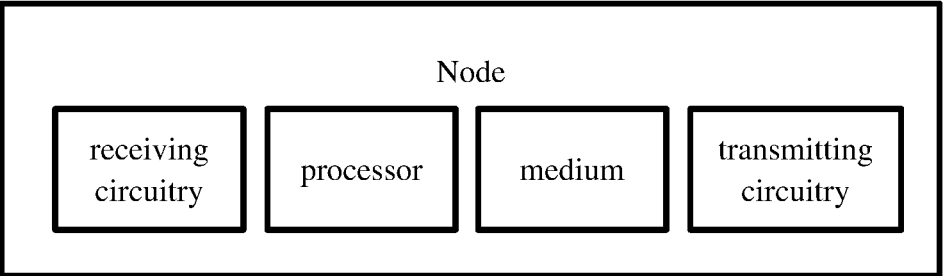
FIG. 9 illustrates a block diagram of a node according to some embodiments of the present disclosure.

FIG. 9 illustrates a block diagram of a node according to some embodiments of the present disclosure.

The node may include a receiving circuitry, a processor, and a transmitting circuitry. In one embodiment, the node may include at least one non-transitory computer-readable medium having computer executable instructions stored therein. The processor can be coupled to the at least one non-transitory computer-readable medium, the receiving circuitry and the transmitting circuitry. The computer executable instructions can be programmed to implement a method with the receiving circuitry, the transmitting circuitry and the processor. The method implemented by the node of FIG. 9 can be any one of the methods shown in FIG. 3, 5 or 6-8.

The method of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. An apparatus A first node for wireless communication, comprising:

at least one memory; and at least one processor coupled with the at least one memory and operable to cause the first node to:

transmit a request associated with a prediction for a status of a wireless network to a second node and a third node;

receive information of a trained artificial intelligence (AI) model from the third node;

transmit, to the second node and based at least in part on the information, data for input to the trained AI model; and receive the prediction from the second node, wherein the prediction is based at least in part on the trained AI model and the data.

2. The first node of claim 1, wherein the request comprises at least one of:

an identity of a user equipment (UE) associated with the trained AI model;

an identity of a radio access network (RAN) node associated with the trained AI model;

an identity of a cell associated with the trained AI model;

an accuracy of the prediction;

an improvement requirement associated with the accuracy;

time information;

first information of the input; or a function of the trained AI model.

3. The first node of claim 1, wherein the information comprises at least one of:

an identity of the trained AI model;

an identity of a user equipment (UE) associated with the trained AI model;

an identity of a radio access network (RAN) node associated with the trained AI model;

an identity of a cell associated with the trained AI model;

a list of predictions associated with the trained AI model;

an accuracy associated with each item in the list of predictions;

an improvement associated with each item in the list of predictions;

second information of the input;

a function of the trained AI model; or third information of feedback.

4. The first node of claim 3, wherein the at least one processor is further operable to cause the first node to:

transmit a feedback for the trained AI model to the third node based at least in part on the third information of the feedback, wherein the feedback comprises at least one of:

an identity of the trained AI model;

a cause for transmitting the feedback; or additional data for AI model training.

5. The first node of claim 4, wherein the feedback for the trained AI model is transmitted periodically with a predetermined period or in one shot with a format, and wherein the cause for transmitting the feedback comprises the accuracy or the improvement being below a threshold.

6. The first node of claim 1, wherein the at least one processor is further operable to cause the first node to:

receive an AI capability of a radio access network (RAN) node via at least one of:

an Xn interface from the RAN node during a Xn interface setup procedure, a SN addition procedure, or a SN modification procedure; or an N2 interface from operations, administration and maintenance (OAM) or access and mobility management function (AMF).

7. The first node of claim 6, wherein the AI capability comprises at least one of inference, training an AI model, providing an AI model, updating an AI model, or providing the prediction.

8. The first node of claim 1, wherein the at least one processor is further operable to cause the first node to:
  receive an additional request from a radio access network (RAN) node or transmit the additional request to the RAN node, wherein the additional request comprises at least one of:
    a measurement of the status of the wireless network and time information associated with the measurement;
    the prediction and time information associated with the prediction;
    a period for an update of the status of the wireless network;
    an improvement requirement;
    a period of the measurement; or
    a period of the prediction.

9. The first node of claim 1, wherein the information comprises one or more UE identifiers of one or more user equipment (UEs), and wherein the trained AI model is configured to generate the prediction for the one or more UEs.

10. The first node of claim 9, wherein the at least one processor is further operable to cause the first node to:
  select, based at least in part on the one or more UE identifiers, the data for input to the trained AI model, wherein the data comprises measurement data associated with the one or more UEs.

11. The first node of claim 1, wherein the first node comprises at least one of a radio access network (RAN) node or a data node configured to request and receive the prediction, wherein the second node comprises an AI inference node configured to generate the prediction based at least in part on the data, and wherein the third node comprises an AI training node configured to train the AI model.

12. The first node of claim 1, wherein the at least one processor is further operable to cause the first node to:
  receive, from at least one of a user equipment (UE) or a radio access network (RAN) node, the data for input to the trained AI model, wherein the data comprises at least one of a measurement of the status of the wireless network, time information associated with the measurement, a period for an update of the status of the wireless network, or a period of the measurement.

13. The first node of claim 1, wherein the information requests training data associated with the trained AI model, and wherein the at least one processor is further operable to cause the first node to:
  transmit, to the third node, feedback for the trained AI model, wherein the feedback comprises at least one of an identity of the trained AI model, a cause for transmitting the feedback, or the training data.

14. A third node for wireless communication, comprising:
  at least one memory; and
  at least one processor coupled with the at least one memory and operable to cause the third node to:
    receive a request associated with a prediction for a status of a wireless network from a first node or from a second node;
    transmit a trained artificial intelligence (AI) model to the second node; and
    transmit information of the trained AI model to the first node, wherein the prediction is based at least in part on the trained AI model and data associated with the information.

15. The third node of claim 14, wherein the request comprises at least one of:
  an identity of a user equipment (UE) associated with the trained AI model;
  an identity of a radio access network (RAN) node associated with the trained AI model;
  an identity of a cell associated with the trained AI model;
  an accuracy of the prediction;
  an improvement requirement associated with the accuracy;
  time information;
  first information of an input for the trained AI model; or
  a function of the trained AI model.

16. The third node of claim 14, wherein the information comprises at least one of:
  an identity of the trained AI model;
  an identity of a user equipment (UE) associated with the trained AI model;
  an identity of a radio access network (RAN) node associated with the trained AI model;
  an identity of a cell associated with the trained AI model;
  a list of predictions;
  an accuracy associated with each item in the list of predictions;
  an improvement associated with each item in the list of predictions;
  second information of an input for the trained AI model;
  a function of the trained AI model; or
  third information of feedback.

17. The third node of claim 16, wherein the at least one processor is further operable to cause the third node to:
  transmit, to the first node, at least one of a predetermined period or a one shot format associated with the feedback for the trained AI model; and
  receive, based at least in part on the at least one of the predetermined period or the one shot format, the feedback for the trained AI model from the first node based at least in part on the third information of the feedback, wherein the feedback comprises at least one of an identity of the trained AI model, a cause for transmitting the feedback, or additional data for AI model training.

18. The third node of claim 17, wherein the feedback for the trained AI model is received periodically with the predetermined period or in one shot with the one shot format, and wherein the cause for transmitting the feedback comprises an accuracy or an improvement of the trained AI model being below a threshold.

19. A second node for wireless communication, comprising:
  at least one memory; and
  at least one processor coupled with the at least one memory and operable to cause the second node to:
    receive, from a first node, a request associated with a prediction for a status of a wireless network;
    receive, from a third node, a trained artificial intelligence (AI) model;
    receive, from the first node and based at least in part on information associated with the trained AI model, data for input to the trained AI model;
    generate the prediction as output from the trained AI model based at least in part on the request; and
    transmit the prediction to the first node.

20. The second node of claim 19, wherein the request comprises at least one of:
  an identity of a user equipment (UE) associated with the trained AI model;

an identity of a radio access network (RAN) node asso-
ciated with the trained AI model;
an identity of a cell associated with the trained AI model;
an accuracy of the prediction;
an improvement requirement associated with the accu-
racy;
time information;
first information of the input; or
a function of the trained AI model.

* * * * *

18